United States Patent [19]

Avery et al.

[11] Patent Number: 4,719,338

[45] Date of Patent: Jan. 12, 1988

[54] POCKET CALCULATOR WITH CREDIT CARD CONTROLLER AND DISPENSER

[75] Inventors: James M. Avery, Austin, Tex.; Madhu C. Patel, Wichita, Kans.

[73] Assignee: NCR Corporation, Dayton, Ohio

[21] Appl. No.: 764,903

[22] Filed: Aug. 12, 1985

[51] Int. Cl.⁴ ............................................. G06K 5/00
[52] U.S. Cl. .................................... 235/380; 235/379; 235/441; 235/486; 235/492
[58] Field of Search ................ 364/705; 235/379, 380, 235/441, 492, 486

[56] References Cited

U.S. PATENT DOCUMENTS

| | | | |
|---|---|---|---|
| 3,548,160 | 12/1970 | Welsh | 235/61.6 |
| 4,017,835 | 4/1977 | Randolph | 340/152 R |
| 4,053,735 | 10/1977 | Foudos | 235/61.9 R |
| 4,091,270 | 5/1978 | Musch et al. | 235/419 |
| 4,208,575 | 6/1980 | Haltof | 235/380 |
| 4,219,151 | 8/1980 | Haruki | 235/379 |
| 4,277,837 | 7/1981 | Stuckert | 364/900 |
| 4,491,049 | 1/1985 | Mizuta et al. | 364/705 X |
| 4,523,297 | 6/1985 | Ugon et al. | 364/900 |

Primary Examiner—David L. Trafton
Attorney, Agent, or Firm—Wilbert Hawk, Jr.; Albert L. Sessler, Jr.; George J. Muckenthaler

[57] ABSTRACT

A portable transaction processing calculator has a keyboard and a display window along with slots for holding at least a pair of credit cards. One of the cards includes storage means therein and is electically connected with the calculator, and another card has optical or other readable data thereon and readable by optical or other equipment. A selector switch on the calculator selects one of four different operations.

3 Claims, 5 Drawing Figures

POCKET CALCULATOR WITH CREDIT CARD CONTROLLER AND DISPENSER

BACKGROUND OF THE INVENTION

In the field of data processing, the personal or pocket-type calculator has enjoyed success by individual users for performing various types of financial transactions. It is common practice and procedure to use the calculator for performing a number of arithmetic and like functions and it is also seen that additional or related functions are feasible when using these small portable units. The portable units or terminals are useful in a "cashless" environment wherein banking and/or retail transactions can be continually processed and updated to reflect the current status of one or more accounts.

While it is seen that many of the early pocket calculators had limited capabilities in number and type of functions, later units have included means for accomplishing such additional functions as well as connecting or interfacing with peripheral or related equipment in time saving and lower cost operations.

Representative documentation in the field of calculators and control means therefor includes U.S. Pat. No. 3,548,160, issued to W. B. Welsh on Dec. 15, 1970, which discloses apparatus with means for receiving a record containing fixed data in the form of a code as well as variable data input from a keyboard, and wherein the fixed and the variable coded data are of the same form and are scanned to produce output signals which can be inserted in the data processing system.

U.S. Pat. No. 4,017,835, issued to R. D. Randolph on Apr. 12, 1977, discloses a credit status verification system having input terminals along with a central terminal unit connected to send and receive messages in a computer system.

U.S. Pat. No. 4,053,735, issued to J. N. Foudos on Oct. 11, 1977, discloses a portable unit for receiving credits for checks relative to a bank assured-check computer-based credit disbursing system.

U.S. Pat. No. 4,091,270, issued to B. E. Musch et al. on May 23, 1978, discloses a portable, electronic, keyless calculator with an optical bar code reader, a read-write memory unit for storing the entered information, a central processing unit having a read-only memory with pre-stored routines, and a display unit for displaying entered data and execution results. An alternative embodiment of the calculator includes both an optical bar code reader and a keyboard as input devices for entering data.

U.S. Pat. No. 4,208,575, issued to G. P. Haltof on Jun. 17, 1980, discloses a credit card or check validator which includes a keyboard, a scrambler circuit and a comparator circuit.

U.S. Pat. No. 4,219,151, issued to T. Haruki on Aug. 26, 1980, discloses a verification system having reading means to read first data from a card, input means manually operable to enter second data different from the first data, function storage means for different functions, calculating means for calculating a functional value, and checking means for checking relationship between a portion of the data and the calculated value.

U.S. Pat. No. 4,277,837, issued to P. E. Stuckert on Jul. 7, 1981, discloses a portable terminal or calculator for use with one or more data storage and transfer cards, and including keyboard means for entering data and control information, means for temporarily storing transaction data, and logic means for performing arithmetic, logical, and control operations, and also means for storing predetermined programs. Display means selectively displays transaction data and selected data is transferred into storage means in an external device and into at least one card. One or more of such data storage and transfer cards can be inserted into a slot position on the bottom of the calculator and transfer of data may take place between the card and the calculator or between two cards and the calculator, dependent, in part, on the movement of one or another card to one of several positions.

And, U.S. Pat. No. 4,523,297, issued to M. Ugon et al. on Jun. 11, 1985, discloses a portable hand-held data processor having a keyboard, a display and a slot for a removable card. A first microprocessor and a first memory are connected to the keyboard and the display, and a second microprocessor and a second memory are included in the card with a single line connecting the first and the second microprocessors and memories.

SUMMARY OF THE INVENTION

The present invention relates generally to data or information processing apparatus of the portable or pocket-type along with peripheral equipment associated therewith. More particularly, the invention relates to the combination of a handheld calculator with means for holding or containing one or more cards and means for reading data or information on the cards. The calculator incorporates a pair of slots for receiving and holding an optical or other storage type credit card and an EAROM-based credit card.

The optical or other storage type credit card contains data or information thereon which is readable with optical or other means that includes the use of laser or holographic techniques. The optical card may be used in programming data processing apparatus or machines by insertion of the card therein, or an optical reader probe or like portable-type instrument can be used to read the card. The EAROM-based credit card includes both memory and logic devices embedded therein and is electrically connected with the handheld calculator in means and manner to access all storage present in the card. Further, the calculator operates as an input/output device and includes LCD display along with a keyboard for entering character data and function operation and also includes selector means thereon for choosing or making a selection of one of several operations.

In view of the above discussion, the principal object of the present invention is to provide a portable calculator with capability for performing additional functions.

Another object of the present invention is to provide a combined controller and dispenser for accommodating different types of credit cards.

An additional object of the present invention is to provide a portable calculator which can electrically communicate with and access information in a memory-based credit card.

A further object of the present invention is to provide a hand-held calculator having slots therein for receiving one or more credit cards and for electrically connecting the calculator with a credit card.

Still another object of the present invention is to provide a transaction processing device having means for making a selection of one of several operations to be performed and utilizing the credit cards associated with the processing device.

Additional advantages and features of the present invention will become apparent and fully understood from a reading of the following description taken together with the annexed drawing.

DESCRIPTION OF THE PREFERRED EMBODIMENT

Figure 1:
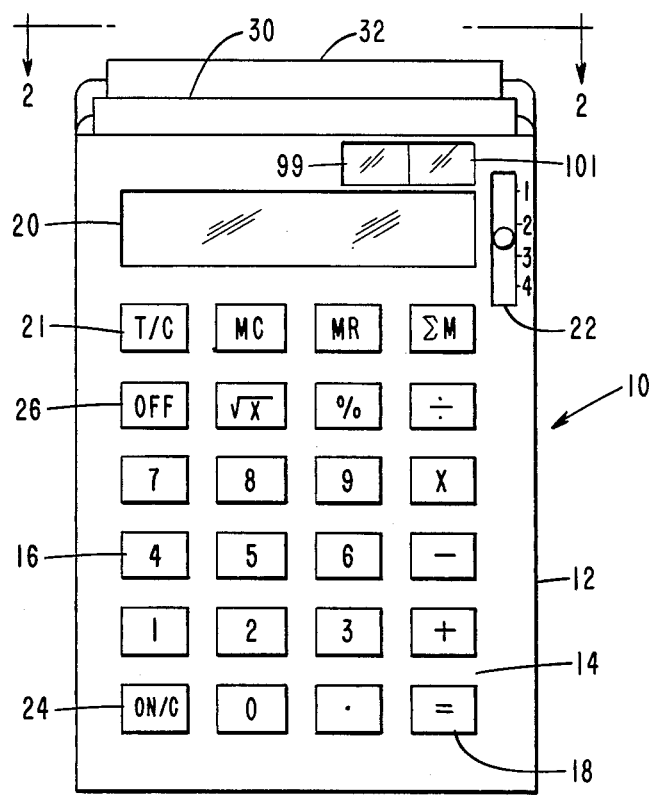
FIG. 1 is a top view of a portable calculator incorporating the subject matter of the present invention.
Figure 2:
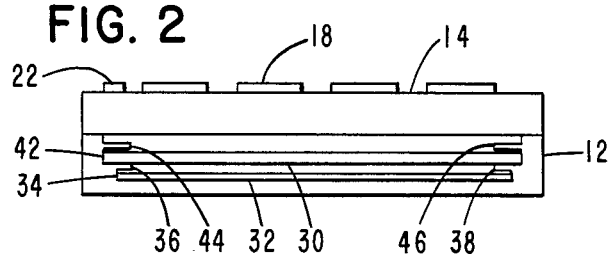
FIG. 2 is an end view taken on the line 2—2 of FIG. 1.

FIG. 1 illustrates a top view of data or information processing apparatus in the form of a pocket calculator or transaction unit 10 having a housing 12, an input keyboard 14 with amount or data keys 16 and entry or function keys 18, and an LCD (liquid crystal diode) display 20. A sliding-type switch 22 is located adjacent the display 20 on the housing 12 for use in selecting different modes of operation by moving the switch to one of several positions. An on switch 24 and an off switch 26 are conveniently located on the keyboard 14.

The subject matter of the present invention, in the manner of a controller and dispensing device, combines the elements of the pocket calculator 10, a credit-type card 32 having optical, magnetic or other readable information or data incorporated on or stored in the card 32, and an electrically alterable or "smart" credit card 30. The calculator or transaction unit 10 has access to all data or information in storage in the EAROM (electrically alterable read only memory) credit card 30, and the calculator housing 12 also provides means to store the two credit cards. By way of identifying the several parts used in the practice of the invention, the pocket calculator is Canon Card Quartz LC-61T, made by Canon Inc., Tokyo, Japan, the "smart" credit card 30 is SGS-M274, made by SGS-ATES Semiconductor Corporation, Scottsdale, Ariz., and an optical or other storage-type credit card 32 may be an NCR Opticard, manufactured by NCR Corporation, Dayton, Ohio.

A first or bottom slot 34 which may be formed by means of side rails 36 and 38 is provided for holding or containing the optical credit card 32 and positioned for ease of dispensing such card. The card 32 may be used for programming data processing equipment by removing the card from the slot 34 and inserting the card into an appropriate apparatus or machine. Another use for the optical credit card 32 is in an arrangement using an optical reader probe or like portable type instrument for reading the card.

A second or upper slot 42 which may be formed by side rails 44 and 46 is provided for holding or containing the credit card 30 which has means thereon for electrically connecting with the calculator 10. The EAROM or "smart" credit card 30 may include slide contacts on a surface or edge contacts for electrically interfacing with mating contacts on the calculator or transaction unit 10. The "smart" card 30 is electrically connected with the calculator 10 whereas the card 32 is only carried thereby.

The slide switch 22 can be moved to one of four positions wherein position 1 provides a date/time function on the display 20, position 2 reads and accesses the data or information from the "smart" card 30, position 3 provides for setting the date/time, and position 4 is the normal calculator mode. The calculator-size transacting unit 10 is basically an input/output device in that it accepts keyboard data and, depending upon the switch 22 mode, communicates with the "smart" card 30 to perform the several transactions.

In the "smart" card transaction mode of position 2, the preprograms of the transaction unit 10 allow the normal keyboard 14 to operate in an arrangement utilizing certain function keys 18 or user-definable keys. The user can define some keys for certain lengthy account numbers, which defined keys can be operable only after entering a password or personal identification number (PIN).

Figure 3:
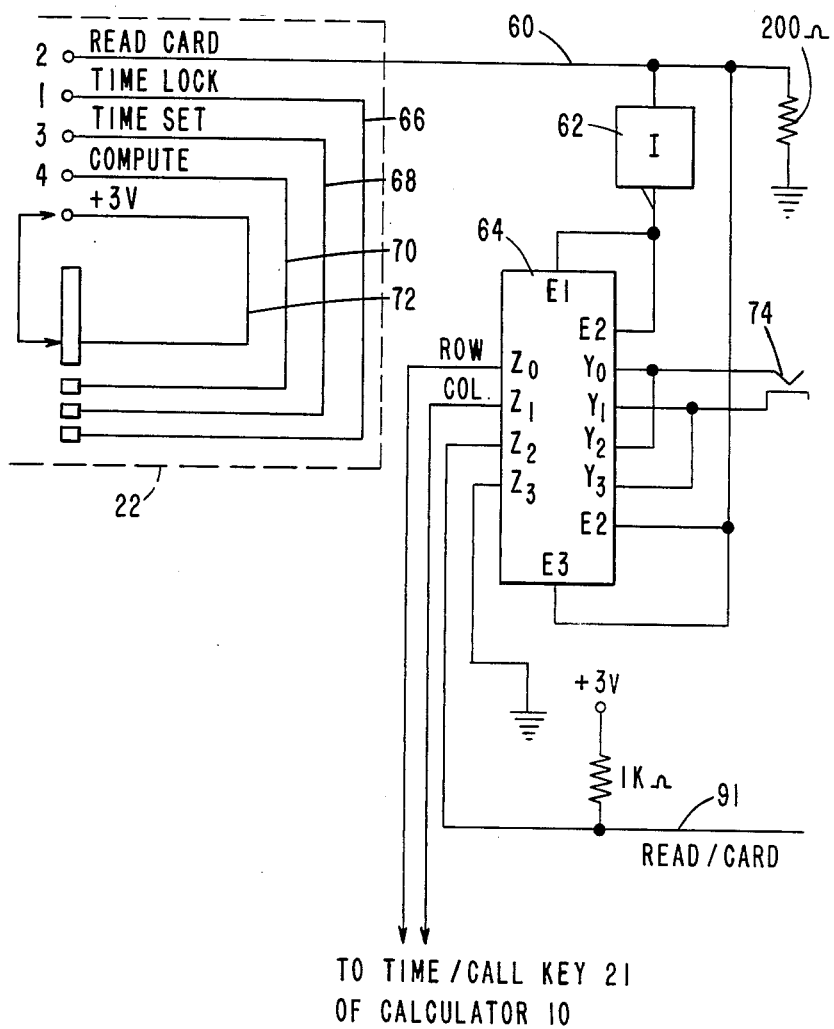
FIG. 3 is a schematic diagram of certain connections of the portable calculator.

FIG. 3 is a schematic diagram of certain connections of the portable calculator 10 relating to the time function and including leads or lines connected to the selector switch 22. A READ CARD line 60 is connected to the calculator switch contact number 2 of switch 22 and through an inverter 62 to an analog switch device 64, Texas Instruments type number 4066. The outputs $Z_0$ and $Z_1$ (row and column) of device 64 are coupled to the TIME/CALL key 21 of the calculator, as shown in FIG. 3. The switch device 64 is connected in the circuit between a switch 74 and the TIME/CALL key 21 of the calculator 10 such that when the switch device 64 is activated, switch 74 functions as either a TIME/CALL key when slide switch 22 is placed in position 1, or functions as a READ CARD key when slide switch 22 is placed in position 2. A TIME LOCK line 66 is connected to switch contact number 1 of switch 22 for purposes of reading date/time. A TIME SET line 68 is connected to switch contact number 3 of switch 22; a COMPUTE line 70 is connected to switch contact number 4 of switch 22; and a plus 3 volt line 72 is connected to the switch 22.

Figure 4A:
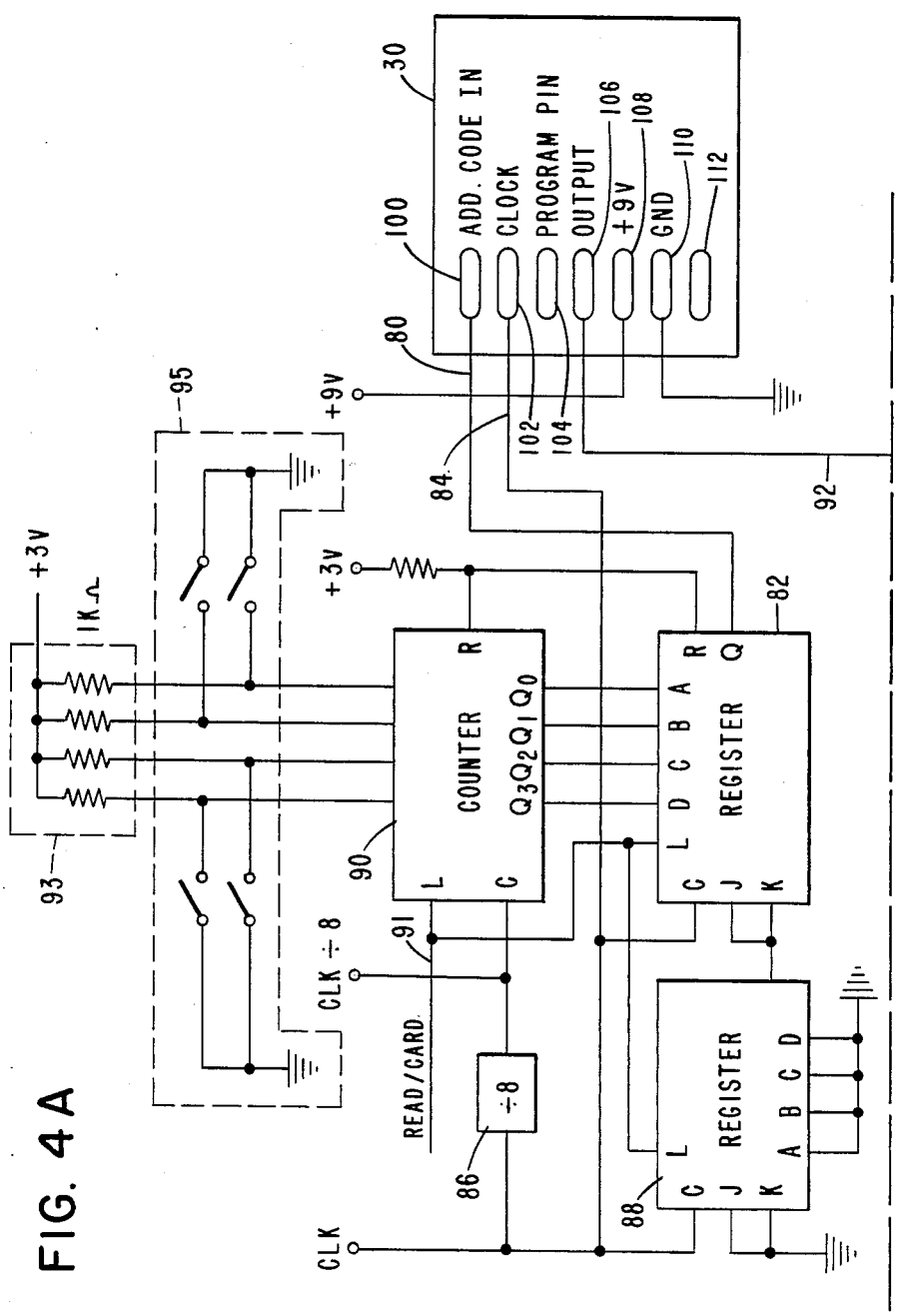
FIGS. 4A and 4B constitute a schematic diagram of certain connections of the EAROM-based credit card.
Figure 4B:
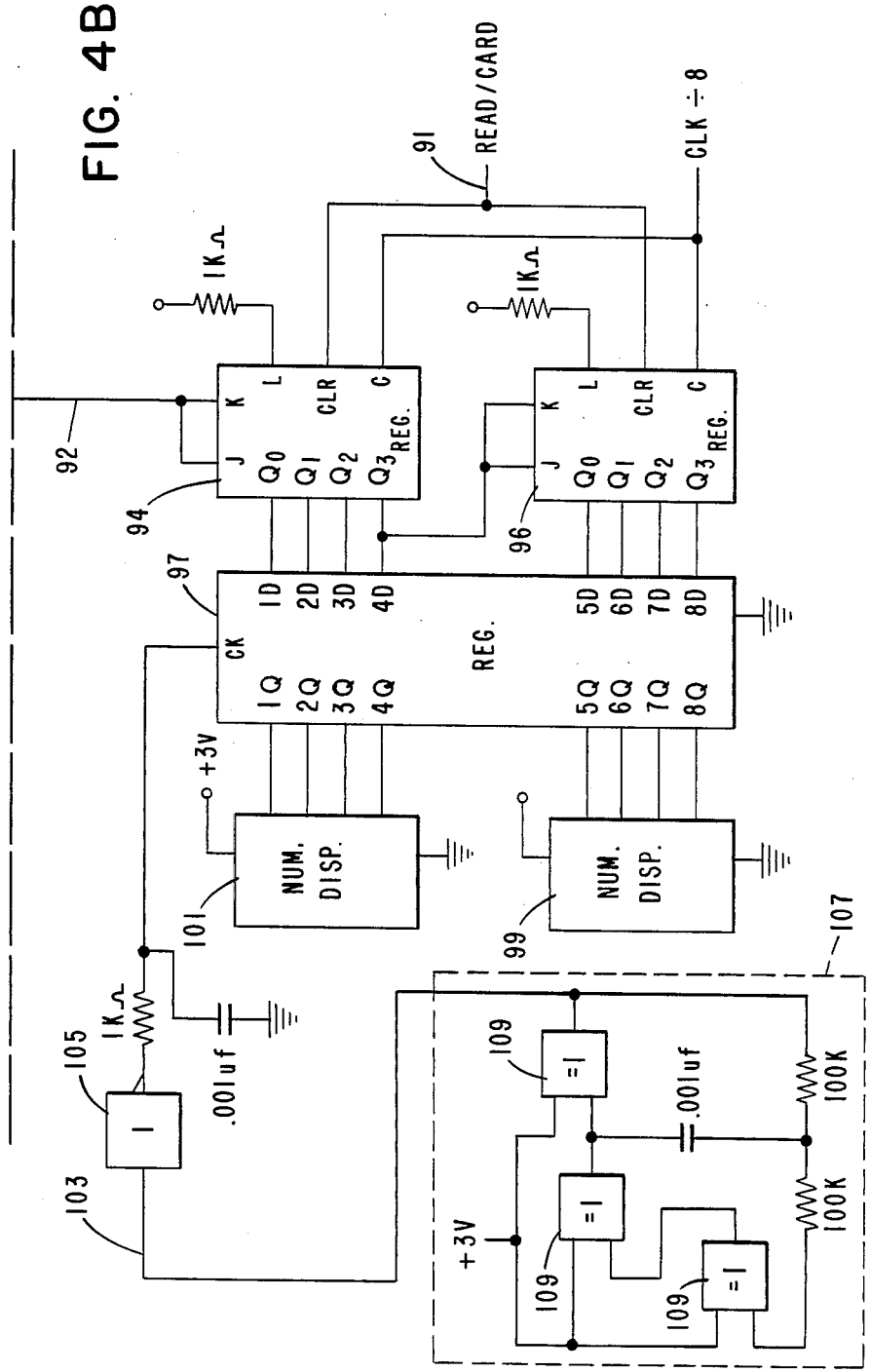

FIGS. 4A and 4B constitute a schematic diagram of certain connections between devices incorporated into the pocket calculator 10 and the "smart" credit card 30. An ADDRESS CODE input line 80 is coupled from a contact 100 capable of engaging a complementary terminal on the card 30 to a shift register device 82 (column register), Texas Instruments type number HC195. A CLOCK input line 84 coupled to a contact 102 engageable with a terminal on the card 30 is provided to several devices, which include a divide by eight device 86, and a shift register device 88 (row register), Texas Instruments type number HC195. The output of divide by eight device 86 is input to a row counter device 90, Texas Instruments type number HC161. The card 30 also includes a PROGRAM PID contact 104 thereon, not used as a part of this invention. An OUTPUT line 92 from a contact 106 engageable with a terminal on the card 30 is input to a shift register device 94, the $Q_3$ output of device 94 being connected as an input to a shift register device 96, both devices being type number HC195. A 9 volt line is input to contact 108 on the card 30 and a ground lead is provided for card 30 at contact 110. A spare contact 112 is also provided on the card 30. A plurality of column select switches, as at 95, are connected to the row counter 90 and a 3 volt line is supplied through a bank of resistors, as at 93.

The outputs of registers 94 and 96 are connected to a register 97, Texas Instruments type number 374, and such register 97 is connected to a pair of numeric displays 99 and 101, Texas Instruments type number 4D57. The numeric displays 99 and 101 are shown as a part of the calculator 10 in FIG. 1. A clock signal 103 is provided through an inverter 105 to the register 97. The clock signal 103 is provided by an oscillator circuit 107 which maintains a normally constant clock of a frequency between 30 and 100 hertz. The oscillator circuit is a READ/DISPLAY unit and includes a plurality of QUAD exclusive OR gates 109, National Semiconductor number CD4030.

The several components shown in FIGS. 3 and 4A and B are known as "flat-pack" devices for use in thin calculators or like apparatus. The selection of data to and from the "smart card" is serial in nature wherein the address is presented to the calculator and the contents are read out all in a manner of utilizing logic means between the calculator and the card in a parallel to serial converting arrangement.

An example of the use of the transaction unit 10 in the "smart" card 30 transaction mode is for checking balances of bank accounts or department store accounts wherein the user (1) enters his bank account number or his department store account number and (2) reads the balance from the "smart" card. In this mode of operation, the above steps can be performed at any convenient time and place.

Another example of the use of the "smart" card 30 and transaction unit 10 arrangement is for operating with an automatic teller machine wherein the user (1) enters his bank account number, (2) selects the deposit or withdrawal mode, (3) enters the amount, and indicates whether cash or a check is desired, (4) inserts the "smart" card 30 into an automatic teller machine card reader, (5) updates the card, (6) dispenses cash or one or more checks or deposits cash or one or more checks, and (7) provides for release of the card. It is noted that the first three steps may be performed ahead of time and remote from the automatic teller machine.

A third example of the use of the "smart" credit card 30 is for purchasing merchandise at a department store wherein the user (1) enters his department store account number, (2) reads the amount purchased and compares such purchased amount with his credit balance, (3) determines if his credit balance is low and if so, enters his bank account number and reads the bank balance, (4) if the bank balance shows a credit, the user continues with the next steps of this example. However, if the bank balance shows a debit, the user alternatively performs a transaction of the above-noted second example at the automatic teller machine to provide a bank balance credit, (5) he then transfers an amount from the bank account to the department store account, (6) purchases the merchandise, (7) the department store clerk accepts the "smart" card and completes the transaction, and (8) the user updates the "smart" card by performing the transaction steps of the above first example. In this mode of operation the first five steps may be performed ahead of time and remote from the ATM.

And finally, an example of the use of the "smart" card 30 is associated with an emergency medical situation wherein (1) a person is involved and injured in an accident, (2) a medical person selects the position 2 mode of the switch 22 for reading information from the injured person's "smart" card, and (3) a predefined medical key (or keys) is entered into the keyboard 14 to read information from the "smart" card 30 relating to medical history or restrictions of the injured person.

The credit card 32 which is held by the calculator 10 may include additional data relative to the medical history of the injured person and depending upon the nature or extent of the injury and upon the application program developed, such data can be transferred to the "smart" card by use of a central terminal system that reads data or information from both the card 32 and the "smart" card 30.

It is thus seen that herein shown and described is a pocket calculator or transaction unit that holds a "smart" credit card and a further storage credit card and wherein the elements are operably associated to perform a plurality of transactions. The intent of this assembly is to provide the pocket calculator with access to all storage present either in the "smart" card or stored on the other credit card and at the same time to provide means for storing the removable cards when not in use. Access to information or data in the "smart" card is by direct connection with the calculator, while access to storage on the other card is by means of a central terminal or reading station. The apparatus and arrangement enables the accomplishment of the objects and advantages mentioned above, and while a preferred embodiment of the invention has been disclosed herein, variations thereof may occur to those skilled in the art. It is contemplated that all such variations not departing from the spirit and scope of the invention hereof are to be construed in accordance with the following claims.

What is claimed is:

1. A transaction processing device comprising a
hand held calculator having keyboard means and display means operably associated to input data and to display said data, a
first credit card carried by the calculator and being electrically alterable and having memory means therein and accessible by the calculator for providing a plurality of functions, a
second credit card carried by the calculator and usable to transact operations remote from the calculator,
first and second slots for containing said first and second credit cards in positions wherein said first credit card is positioned between said second credit card and said calculator, and
switch means on the calculator slidable to one of a plurality of positions for making a selection of normal calculator operation or for reading information from the first credit card for processing thereof relative to said functions including display of information, reading and accessing information, and setting of information.

2. In a portable calculator having a keyboard and a display window, a
first credit card carried by the calculator and being electrically alterable and including storage means therein and operably associated electrically with the calculator for providing a plurality of functions, a
second credit card carried by the calculator and usable to transact operations remote from the calculator, a
first slot and a second slot for containing said first credit card and said second credit card in positions wherein said first credit card is positioned between said second credit card and said calculator, and
switch selection means on the calculator and movable to one of a plurality of positions for normal calculator operation or for reading information from the first credit card and for processing of such information relative to said functions including display of information, reading and accessing information, and setting of information.

3. A transaction processing device comprising a hand held calculator having keyboard means and display means operably associated for inputting data and for displaying said data, slot means for carrying and retaining a first credit card, electrically alterable and having memory means, and operably associated with the calculator for providing a plurality of functions, slot means for carrying and retaining a second credit card, said second credit card being usable to transact operations remote from the calculator, and said first credit card being positioned between said second credit card and said calculator, and switch means slidable on the calculator for making a selection of normal calculator operation, for reading and accessing information from the first credit card relative to at least one of said functions, for setting functional information, and for displaying functional information.

* * * * *